R. W. FUNK.
VEHICLE WHEEL RIM.
APPLICATION FILED JAN. 15, 1912.
1,146,420.
Patented July 13, 1915.
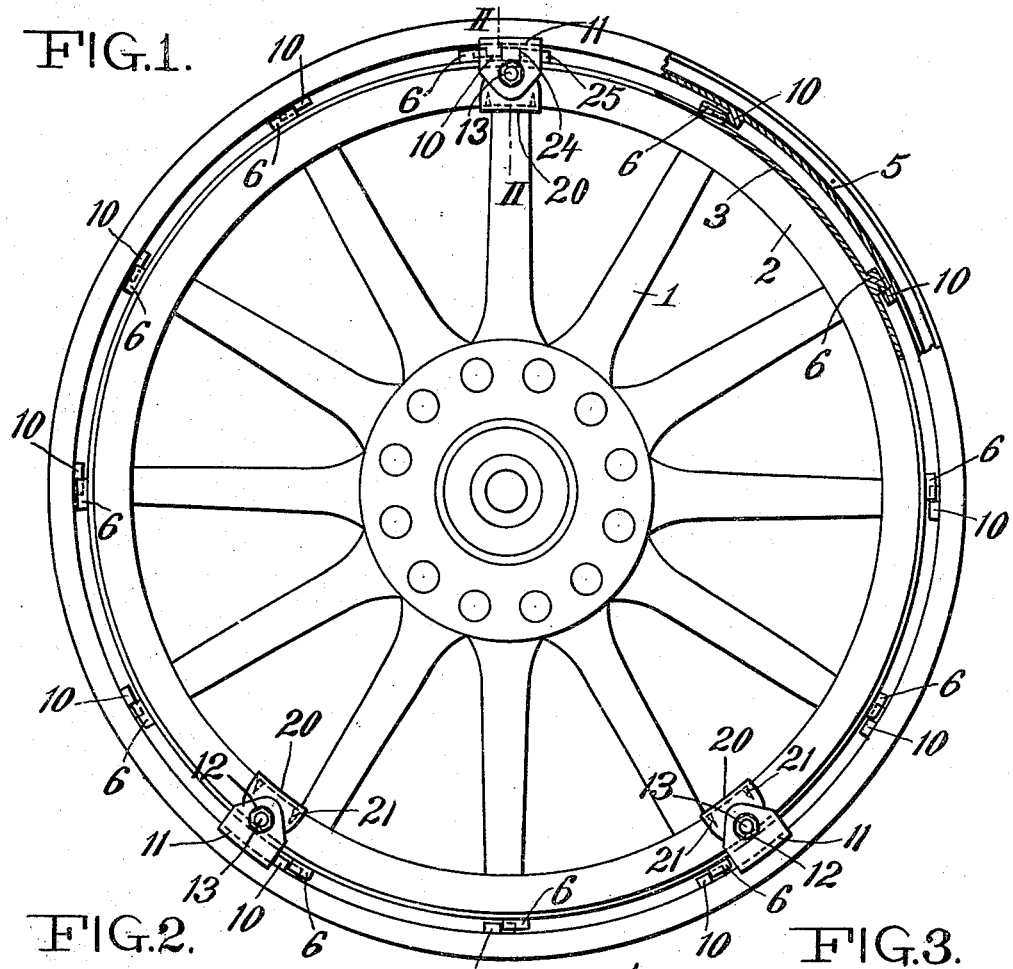
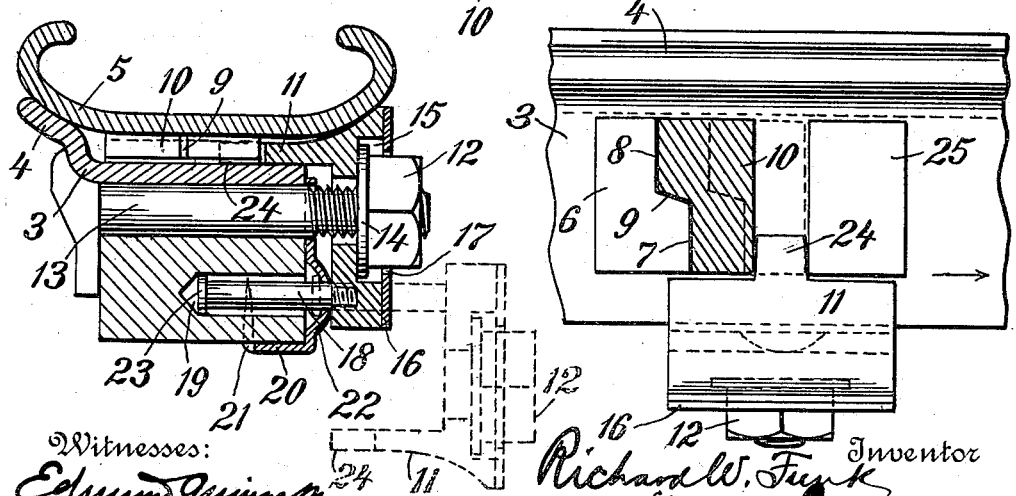

UNITED STATES PATENT OFFICE.

RICHARD W. FUNK, OF WEEHAWKEN, NEW JERSEY, ASSIGNOR TO R. W. FUNK, INCORPORATED, OF NEW YORK, N. Y., A CORPORATION OF NEW YORK.

VEHICLE WHEEL-RIM.

1,146,420.   Specification of Letters Patent.   Patented July 13, 1915.

Application filed January 15, 1912.   Serial No. 671,168.

*To all whom it may concern:*

Be it known that I, RICHARD W. FUNK, a citizen of the United States, residing in the city of Weehawken, county of Hudson, and State of New Jersey, have invented certain new and useful Improvements in Vehicle Wheel-Rims, of which the following is a specification.

My invention relates to rims of the demountable type; that is, a vehicle wheel structure having a tire-carrying rim separable from the felly and its associated devices, in combination with means for locking the tire-carrying rim upon the felly in operative position.

In my improved device the inner periphery of the tire-carrying rim and the outer periphery of the felly band are provided with interlocking means adapted to engage each other by the relative rotation of the two parts through a small arc. One or more wedge members interposed between the tire-carrying rim and the felly band are provided for securing the tire rim and felly in their predetermined operative position. The removal of these wedges permits the tire-carrying rim to be released from the felly band and, with its tire, to be removed as a unit from the wheel.

In the accompanying drawings, which form a part of this specification, Figure 1 is a side elevation of a wheel equipped with my improved device; Fig. 2 is a transverse sectional view on line II—II of Fig. 1; Fig. 3 is a top view of Fig. 2 with the tire rim removed.

Referring to the drawings in detail, the numeral 1 designates a wheel having a felly 2 upon which is permanently secured the felly band 3 about one edge of which is a turned-up flange 4 for supporting one side of the tire-carrying rim 5. Spaced about the outer periphery of the felly band and permanently secured thereto is a plurality of lugs 6. One side of each lug is provided with two parallel faces 7 and 8, substantially perpendicular to the plane of the wheel, and a third face 9 connecting them and inclined to their planes. The tire-carrying rim is provided with a corresponding number of lugs 10 extending radially inward. The faces of the lugs 10, which are adapted to engage the operative faces of the lugs 6, are shaped to conform with the faces 7, 8 and 9 and fit closely thereto when in operative position, as illustrated in Fig. 3. The interlocking of the two sets of lugs 6 and 10 will obviously prevent any side movement or movement in the direction of the axis of the wheel of the tire-carrying rim with respect to the rest of the wheel.

For supporting in a radial direction the side of the tire-carrying rim, opposite to the flange 4, a number of wedges 11 may be provided which enter the space between the felly band and the tire-carrying rim. These wedges may be secured in place by means of a nut 12 engaging a bolt 13 permanently secured to the felly and extending therethrough. The nut 12 is provided with a flange 14 which is confined within a recess 15 in the wedge member by means of a faceplate 16, the faced portion of the nut passing through an opening 17 in the face-plate which is of smaller diameter than that of the flange 14. Detachment of the wedge structure from the felly is prevented by means of a shaft 18 secured to the lower portion of the wedge member and entering a cavity 19 in the felly. This shaft passes through a retaining plate 20 which is secured to the felly by means of staples 21 forced into the same. The plate 20 is provided with a section 22 bulging slightly away from the face of the felly, to form a fulcrum for the wedge structure when it is forced home by the engagement of the nut on the bolt. A flange 23 on the inner extremity of the shaft 18, which is larger in diameter than the opening through the plate 20, prevents the removal of the wedge from the felly, but permits much freedom in adjustment. Three of these wedge members may be used, as shown in Fig. 1. In order to carry the driving strain when the rotation of the wheel is reversed, one of these wedges is provided with an extra tongue 24, which is slightly wedge-shaped and projects between one of the driving lugs 10 and the driving plate 25, which is secured to the felly band.

To remove the tire-carrying rim from the wheel, the three wedges are first backed off from the felly by loosening their nuts and then turned down out of the way into the position indicated by the dotted lines in Fig. 2, so that the tire-carrying rim may be rotated in a direction relative to the wheel, indicated by the arrow in Fig. 3. The lug 10 thereby assumes the position shown by the dotted lines in that figure. The entire rim and tire may then be removed as a unit from the felly by a movement substantially parallel to the axis of the wheel. The reversal of this process accomplishes the mounting of the rim upon the wheel.

It is to be noted, as shown in Fig. 2, that the lugs 10 do not completely fill the space between the inner surface of the tire-carrying rim and the outer periphery of the felly band. There is therefore no tendency for them to rust to the felly band, a feature which has been a serious objection in prior rims having interlocking means on the tire rim and felly. The rim is normally supported in a radial direction entirely by the wedges and the flange at the side of the felly band, although under an extraordinary strain the rim will yield sufficiently to permit its lugs to rest on the felly band, and there is therefore no danger of its collapse from insufficient support in a radial direction.

Having thus described my invention, I claim:

1. In a vehicle wheel, a fixed rim, a tire-carrying rim, and means for mounting the latter upon the former including a plurality of locking members circumferentially spaced about the periphery of the fixed rim and projecting upwardly therefrom, and a similar number of locking members depending from the inner periphery of said tire-carrying rim and adapted to lock said tire-carrying rim against lateral displacement through rotative engagement with said first-named locking members, each of the locking members of the fixed rim having three faces opposed to three faces on a locking member on the tire-carrying rim, their outward and inward pairs of faces lying in parallel planes substantially at right angles to the plane of the wheel, the intermediate pairs of faces being parallel and inclined to the plane of the wheel, and means for supporting the tire-carrying rim in a radial direction and for preventing disengagement of said locking members comprising a plurality of adjustably mounted wedges adapted to seat between said rims, one of said wedges having an extension adapted to seat between a lug on the tire-carrying rim and a lug on the fixed rim, and means for permanently attaching said wedges to said fixed rim.

2. In a vehicle wheel, a fixed rim, a tire-carrying rim, and means for mounting the latter upon the former including a plurality of locking members circumferentially spaced about the periphery of the fixed rim, a similar number of locking members circumferentially spaced about the inner periphery of the tire-carrying rim, and adapted to lock said tire-carrying rim against lateral displacement through rotative engagement with said first-named locking members, each of the locking members of the fixed rim having three faces opposed to three faces on a locking member on the tire-carrying rim, their outward and inward pairs of faces lying in parallel planes substantially at right angles to the plane of the wheel, the intermediate pair of faces being parallel and inclined to the plane of the wheel, and a plurality of wedge members interposed in the annular space between the fixed rim and the tire-carrying rim, one of said wedges having a plurality of supporting surfaces, one of said surfaces supporting the rim in a radial direction and the other of said surfaces preventing disengagement of said locking members through circumferential displacement of the tire-carrying rim with respect to the fixed rim, said wedge members being rotatably attached to said fixed rim.

3. In a vehicle wheel, a fixed rim, a tire-carrying rim, and means for mounting the latter upon the former including a plurality of locking members circumferentially spaced about the periphery of the fixed rim, a similar number of locking members circumferentially spaced about the inner periphery of the tire-carrying rim, and of a depth less than the annular space between said rims, said last-named locking members being adapted to lock said rim on said wheel against lateral displacement through rotative engagement with said first-named locking members, each of the locking members on the fixed rim having three faces opposed to three faces on a locking member on the tire-carrying rim, their outward and inward pairs of faces lying in parallel planes substantially at right angles to the plane of the wheel, the intermediate pair of faces being parallel and inclined to the plane of the wheel, and a plurality of wedge members interposed in the annular space between said rims one of said wedges having a plurality of supporting surfaces, one of said surfaces supporting the rim in a radial direction, and the other of said surfaces preventing disengagement of said locking members through circumferential displacement of the tire-carrying rim with respect to the fixed rim, said wedge members being mounted upon pins entering said fixed rim and adapted to rotate with relation to said rim.

4. In a vehicle wheel, a fixed rim, a tire-carrying rim, and means for mounting the latter upon the former including a plurality of locking members circumferentially spaced about the periphery of the fixed rim, a similar number of locking members circumferentially spaced about the inner periphery of the tire-carrying rim and adapted to lock said rim against lateral displacement through rotative engagement with said first-named locking members, each of the locking members of the fixed rim having three faces opposed to three faces on a locking member on the tire-carrying rim, their outward and inward pairs of faces lying in parallel planes substantially at right angles to the plane of the wheel, the intermediate pair of faces being parallel and inclined to the plane of the wheel, a driving plate spaced from one of the locking members on the fixed rim, and a wedge member interposed in the annular space between the fixed rim and the tire-carrying rim having a plurality of supporting surfaces, one of said surfaces supporting the rim in a radial direction, and the other of said surfaces adapted to be interposed between a locking member on the tire-carrying rim and said driving plate for preventing circumferential displacement of said tire-carrying rim with respect to said fixed rim, said wedge member being adapted to be operated by a nut permanently attached thereto.

RICHARD W. FUNK.

Witnesses:
GERALD E. TERWILLIGER,
OLIVER WILLIAMS.

Copies of this patent may be obtained for five cents each, by addressing the "Commissioner of Patents, Washington, D. C."